(12) United States Patent
Uematsu (10) Patent No.: US 7,174,873 B2
(45) Date of Patent: Feb. 13, 2007

(54) WELDING STRUCTURE FOR SYNTHETIC RESIN INTAKE MANIFOLD

(75) Inventor: Satoshi Uematsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/256,115

(22) Filed: Oct. 24, 2005

(65) Prior Publication Data

US 2006/0086334 A1  Apr. 27, 2006

(30) Foreign Application Priority Data

Oct. 27, 2004 (JP) ............... 2004-311621

(51) Int. Cl.
F02M 35/10 (2006.01)
(52) U.S. Cl. .............................. 123/184.61
(58) Field of Classification Search ........ 123/184.21–184.61; 428/119, 60
See application file for complete search history.

(56) References Cited

U.S. PATENT DOCUMENTS

| | | | |
|---|---|---|---|
| 6,021,753 A * | 2/2000 | Chaffin et al. | 123/184.61 |
| 6,503,352 B2 * | 1/2003 | Nakajima et al. | 156/73.5 |
| 6,532,928 B2 * | 3/2003 | Ogata | 123/184.61 |
| 6,581,561 B1 * | 6/2003 | Brodesser et al. | 123/184.34 |
| 2002/0046725 A1 | 4/2002 | Ogata | |
| 2002/0136856 A1 * | 9/2002 | Sugimura et al. | 428/60 |
| 2003/0155062 A1 | 8/2003 | Kagan et al. | |
| 2004/0200450 A1 * | 10/2004 | Tanikawa et al. | 123/184.42 |

FOREIGN PATENT DOCUMENTS

| | | |
|---|---|---|
| DE | 198 20 198 A1 | 11/1999 |
| DE | 103 00 809 A1 | 7/2004 |
| GB | 839745 | 6/1960 |
| GB | 2 279 035 A | 12/1994 |
| JP | U-63-090063 | 6/1988 |
| JP | 3211592 | 4/1996 |
| JP | A 8-142197 | 6/1996 |
| JP | A 9-174697 | 7/1997 |
| JP | A 10-77917 | 3/1998 |
| JP | 11 287163 | 10/1999 |
| JP | 2002 89388 | 3/2002 |
| JP | A 2002-89388 | 3/2002 |
| JP | A 2002-364469 | 12/2002 |
| WO | WO 2005/014141 A1 | 2/2005 |

OTHER PUBLICATIONS

Vibration Welding of Mouldings and Semi-Finished Products Made of Thermoplastics Polymers in Series Production, Guideline DVS 2217-1, Aug. 1998.

* cited by examiner

Primary Examiner—Marguerite McMahon
(74) Attorney, Agent, or Firm—Kenyon & Kenyon LLP

(57) ABSTRACT

A synthetic resin intake manifold body and a synthetic resin passage structural member are respectively provided with a body side joining flange and a structural member side joining flange that are continuously formed along a joining line. A protrusion is provided on the body side joining flange and a welding protrusion and an inside and an outside control wall are provided on the structural member side joining flange. When the synthetic resin passage structural member is positioned and aligned with respect to the synthetic resin intake manifold body along the joining line prior to welding, a volume of an inside burr retaining groove is set to be larger than a volume of an outside burr retaining groove.

6 Claims, 5 Drawing Sheets

WELDING STRUCTURE FOR SYNTHETIC RESIN INTAKE MANIFOLD

INCORPORATION BY REFERENCE

The disclosure of Japanese Patent Application No. 2004-311621 filed on Oct. 27, 2004 including the specification, drawings and abstract is incorporated herein by reference in its entirety.

BACKGROUND OF THE INVENTION

1. Field of the Invention

The invention relates to a welding structure for a synthetic resin intake manifold in which a synthetic resin passage structural member is welded to a synthetic resin intake manifold body along a joining line that has a loop shape. More specifically, the invention relates to an approach that enables welding to be smoothly performed while ensuring that welding burr does not protrude toward an inside of the joining line when welding.

2. Description of the Related Art

Welding structures for this type of synthetic resin intake manifold are generally known in which a synthetic resin passage structural member that forms at least a portion of a synthetic resin intake manifold is welded along a joining line that has a loop shape to a synthetic resin intake manifold body that forms the rest of synthetic resin intake manifold. Joining flanges are respectively provided on the synthetic resin intake manifold body and the synthetic resin passage forming member along the joining line. A first one of the joining flanges is provided with a protrusion that protrudes towards a second one of the joining flanges. The second joining flange is provided with (i) a welding protrusion which protrudes towards the first joining flange and which is welded to the above mentioned protrusion, and (ii) inside and outside control walls which protrude toward the first joining flange at an inside and an outside of the joining line and which are disposed to either side of the welding protrusion.

However, with the above described welding structure for a synthetic resin intake manifold, when the synthetic resin passage structural member is positioned and aligned with respect to the synthetic resin intake manifold body along the joining line prior to welding, a volume of an inside burr retaining groove formed by the protrusion of the first joining flange and the inside control wall of the of the second joining flange and the welding protrusion of the of the second joining flange, and a volume of an outside burr retaining groove formed by the protrusion of the first joining flange and the outside control wall of the second joining flange and the welding protrusion of the second joining flange are set to substantially the same volume. When the welding protrusion of the second joining flange is welded to the protrusion of the first joining flange and forms welding burr, the welding burr flows to both the inside and outside of the joining line, and is retained in the inside and the outside burr retaining grooves. However, there is a possibility that welding burr that overflows form the inside and outside burr retaining grooves will protrude toward both the inside and outside. If this occurs, it is possible to deal with the welding burr that protrudes toward the outside by removing the protruding portion with a cutter or the like. However, there is no way to treat the welding burr that protrudes toward the inside. Accordingly, the protruding portion will form an obstruction that causes worsening of intake air flow resistance.

To address this problem, technology has been proposed (for example, Japanese Patent Laid-open Publication No. 2002-89388) in which a protrusion of a first joining flange is formed to extend further to an inside than a welding protrusion of a second joining flange. A blocking protrusion is formed at an inside end of the extended protrusion in order to block welding burr that is going to overflow from the inside burr retaining groove at the outside of the inside control wall of the second joining flange (namely, the inside of the inside burr retaining groove). Accordingly, protrusion of welding burr toward the inside from the inside burr retaining groove can be regulated.

However, in the technology, there is a possibility that, when the inside burr retaining groove becomes full of welding burr, the welding burr will pass over the extended protrusion and protrude toward the inside. Moreover, on the other hand, if the welding burr does not pass over the extended protrusion after the welding burr has filled the inside burr retaining groove, the welding burr has no place to escape to at the inside. As a result, there is a possibility that welding of the synthetic resin passage structural member to the synthetic resin intake manifold body will not be performed smoothly and that bulging will occur at an inside portion of the joining line where the joining flanges are welded together. Accordingly, in the technology, it is not possible to address the problem of the welding burr protruding to the inside when the synthetic resin passage structural member is welded to the synthetic resin intake manifold body.

SUMMARY OF THE INVENTION

The invention has been conceived of in light of the above described problems, and it is an object thereof to provide a welding structure for a synthetic resin intake manifold that enables protrusion of welding burr to an inside of a joining line to be controlled when a synthetic resin passage structural member is welded to a synthetic resin intake manifold body.

To achieve the above object, in an embodiment of the invention, a welding structure for a synthetic resin intake manifold is provided in which a synthetic resin passage structural member that forms at least one portion of the synthetic resin intake manifold is welded along a joining line having a loop shape to a synthetic resin intake manifold body that forms the rest of the synthetic resin intake manifold. In this welding structure, the synthetic resin intake manifold body and the synthetic resin passage structural member are respectively provided with joining flanges that are disposed along the joining line. A first one of the joining flanges is provided with a protrusion that protrudes toward a second one of the joining flanges. The second joining flange is provided with a welding protrusion which protrudes toward the first joining flange and which is welded to the protrusion. The second joining flange is also provided with an inside and an outside control wall that respectively protrude toward the first joining flange at an inside and an outside of the joining line. The inside and outside control walls are respectively provided to either side of the welding protrusion. When the synthetic resin passage structural member is positioned and aligned with respect to the synthetic resin intake manifold body along the joining line prior to welding, a volume of an inside burr retaining groove formed by the protrusion of the first joining flange and the inside control wall of the second joining flange and the welding protrusion of the second joining flange is set to be larger than a volume of an outside burr retaining groove formed by the protrusion of the first joining flange and the outside control wall of the second joining flange and the welding protrusion of the second joining flange.

With this configuration, when the synthetic resin passage structural member is welded to the synthetic resin intake manifold body, the welding protrusion of the second joining flange that is welded to the protrusion of the first joining flange forms welding burr. This welding burr flows to the inside and outside of the joining line and is retained in the inside and outside burr retaining grooves, and, once the inside and outside retaining grooves are full, will then go on to overflow toward the inside and outside. A protrusion timing at which the welding burr overflows from the inside and outside retaining grooves and protrudes toward the inside and outside is different for each side due to the difference in the volumes of the burr retaining grooves. More specifically, the welding burr from the outside burr retaining groove overflows and protrudes to the outside prior to when the welding burr from the inside burr retaining groove overflows and protrudes to the inside. As a result, if welding is stopped when the welding burr protrudes to the outside it is possible to reliably inhibit protrusion of the welding burr to the inside. Thus, it is possible to inhibit formation of a protruding portion to the inside. Accordingly, no protruding portion exists that would act as an obstruction causing worsening of intake air flow resistance. As a result, protrusion of the welding burr to the inside when the inside burr retaining groove becomes full can be reliably inhibited in the same manner as if a protrusion were provided to stop the welding burr when it is going to overflow from the inside burr retaining groove. Further, bulging does not occur at an inside portion of the joining line where the joining flanges are welded together due to the welding burr having no place to escape to at the inside when the welding burr fills the inside burr retaining groove. Thus, welding of the synthetic resin passage structural member to the synthetic resin intake manifold body can be performed smoothly. As a result, protrusion of the welding burr to the inside when the synthetic resin passage structural member is welded to the synthetic resin intake manifold body can be reliably managed using a simple structure.

More specifically, the following structures may be adopted in order to specifically set the difference in the volumes of the inside and the outside burr retaining grooves.

When the synthetic resin passage structural member is positioned and aligned with respect to the synthetic resin intake manifold body along the joining line prior to welding, a dimension of the inside burr retaining groove in an inward-outward direction between the inside control wall and the welding protrusion is set to be longer than a dimension of the outside burr retaining groove in the inward-outward direction between the outside control wall and the welding protrusion.

With this configuration, when the synthetic resin passage structural member is welded to the synthetic resin intake manifold body, the dimensional difference in the inward-outward direction of the inside and outside burr retaining grooves causes the welding burrs that respectively flow to the inside and outside of the joining line to flow such that: the welding burr in the outside burr retaining groove definitely overflows and protrudes to the outside prior to when the welding burr in the inside burr retaining groove overflows and protrudes to the inside. Accordingly, if welding is stopped when the welding burr protrudes to the outside, it is possible to reliably inhibit protrusion of the welding burr to the inside. Thus, it is possible to inhibit formation of a protruding portion to the inside, and thereby reliably inhibit worsening of intake air flow resistance. As a result, the protrusion of the welding burr to the inside when the synthetic resin passage structural member is welded to the synthetic resin intake manifold body can be reliably managed using a simple structure.

Moreover, a confirmation-use opening may be provided for confirming a state of progress of welding of the joining flanges at the joining line. In this case, the confirmation-use opening may be (i) positioned at an end tip of the outside control wall at a point that is away from the welding portion of the protrusion and the welding protrusion, and (ii) may be formed as a notch. With this configuration, even if an outflow amount of the welding burr to the outside is small, it is possible to directly view the welding portion of the protrusion and the welding protrusion from the confirmation-use opening. Alternatively, the confirmation-use window may be positioned at a point near to the welding portion of the protrusion and the welding protrusion. In this case, even if the outflow amount of the welding burr to the outside is small, it is possible directly view the welding portion from the confirmation-use opening. In addition, on the other hand, if the outflow amount of the welding burr to the outside is large, it is possible to confirm the state of welding as early as possible before the outside burr retaining groove becomes full since the welding burr protrudes from the confirmation-use openings.

Note that, the confirmation window may be formed as a V-shaped or U-shaped notch in the outside control wall, or may be cut in a circular shape in the outside control wall.

In fundamental terms, as a result of setting the volume of the inside burr retaining groove to be larger than the volume of the outside burr retaining groove, the welding burr from the outside burr retaining groove overflows and protrudes to the outside prior to when the welding burr from the inside burr retaining groove overflows and protrudes to the inside. Accordingly, if welding is stopped at the protrusion timing when the welding burr protrudes to the outside, protrusion of the welding burr to the inside can be reliably inhibited. Thus, it is possible to reliably inhibit worsening of intake air flow resistance caused by formation of a protruding portion to the inside. Further, it is also possible to reliably inhibit protrusion of the welding burr to the inside while performing welding of the synthetic resin passage forming member to the synthetic resin intake manifold body smoothly. As a result, protrusion of the welding burr to the inside can be reliably managed using a simply structure.

DETAILED DESCRIPTION OF THE PREFERRED EMBODIMENTS

A preferred embodiment of the invention will be described with reference to the drawings.

Figure 1:
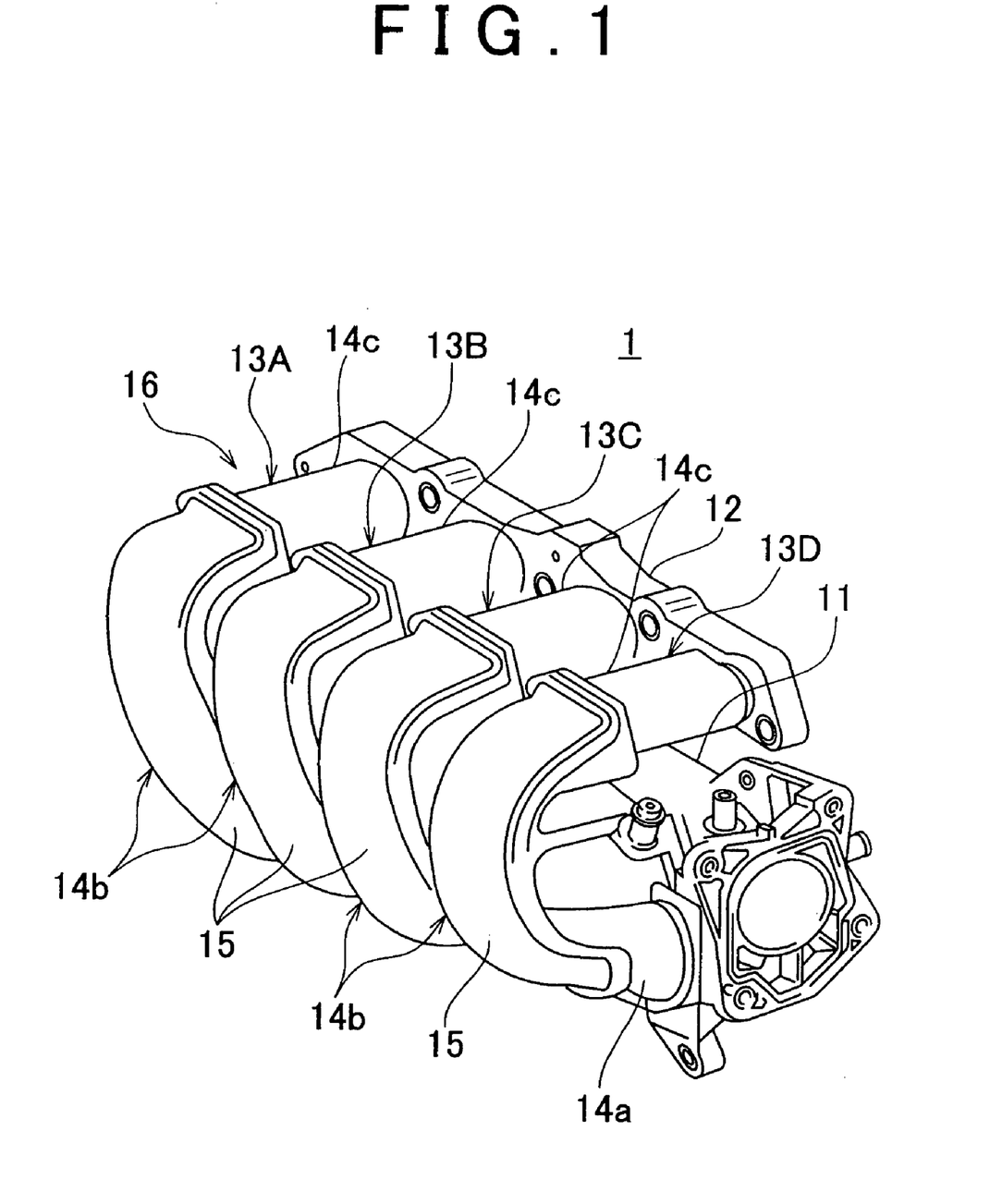
FIG. 1 is a perspective view of a synthetic resin intake manifold that uses a welding structure according to an embodiment of the invention.

FIG. 1 a perspective view of a synthetic resin intake manifold 1 that uses a welding structure according to the embodiment of the invention. This synthetic resin intake manifold 1 supplies intake air to an engine (not shown). In this case, an in-line four cylinder engine is employed as the engine. The synthetic resin intake manifold 1 is integrally provided with a surge tank 11 at an upstream side thereof. A downstream side of the synthetic resin intake manifold 1 is attached to the engine using an attachment use flange 12.

Figure 2:
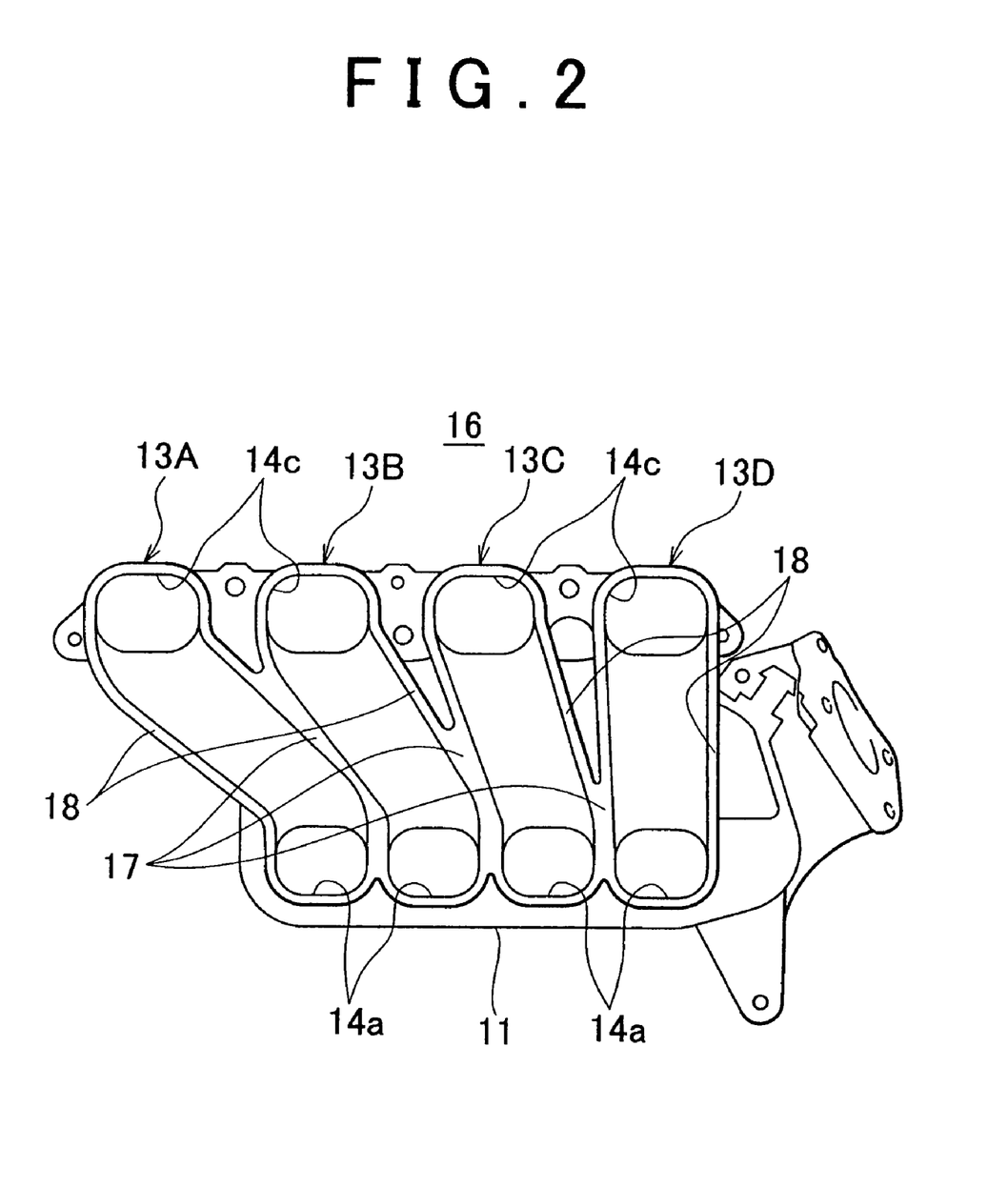
FIG. 2 is a plane view of a synthetic resin intake manifold body as viewed from a side of a joining line.

The synthetic resin intake manifold 1 is formed from thermoplastic resin, and is provided, as shown in FIG. 2, with respective intake passages 13A, 13B, 13C and 13D that correspond to four cylinders, not shown. Each intake passage 13A, 13B, 13C and 13D, as shown in FIG. 1, includes an upstream straight passage portion 14a (only one of these is shown in FIG. 1), a U-shaped passage portion 14b, and a downstream straight passage portion 14c. Each upstream straight passage portion 14a is separately connected at an upstream end thereof to the surge tank 11 and extends in a generally horizontal direction away from the engine side. The U-shaped passage portion 14b bends upwards in a generally U-shaped manner from a downstream end of the upstream straight passage portion 14a and has a downstream end that faces towards the engine side. The downstream straight passage portion 14c extends generally horizontally toward the engine side from the downstream end of the downstream straight passage portion 14c. The synthetic resin intake manifold 1 is divided into a synthetic resin passage structural member 15 (shown in FIG. 1) and a synthetic resin intake manifold body 16 that forms the rest of the synthetic resin intake manifold 1. With this configuration, as shown in FIG. 2, a partition wall 17 is provided in a neighboring space between the neighboring intake passages 13A and 13B and partitions off the intake passages 13A and 13B from each other (the same description applies to the intake passages 13B and 13C, and 13C and 13D). The sections of the partition wall 17 that partition off and are directly contact with the intake passages 13A, 13B, 13C and 13D are not exposed to the outside.

The synthetic resin intake manifold body 16 includes the surface tank 11, the attachment flange 12, and an engine side substantially semi-arc shaped cross section portion 18 (hereinafter referred to as the "engine side semi-arc shaped portion" for simplicity) that forms an engine side of the U-shaped passage portions 14b of the intake passages 13A, 13B, 13C and 13D. The synthetic resin passage structural member 15 is formed from an opposite-engine side substantially semi-arc shaped cross section portion which (i) forms a separateable portion of the U-shaped passage portions 14b of each of the intake passages 13A, 13B, 13C and 13D of the synthetic resin intake manifold 1 and which is (ii) positioned at the side of the U-shaped passage portion 14b of the intake passages 13A, 13B, 13C and 13D that is opposite to the engine. The synthetic resin passage structural member 15 is formed as a single integral unit and covers the engine side semi-arc shaped portion 18 of the U-shaped passage portions 14b of the intake passages 13A, 13B, 13C and 13D from the opposite engine side. In this embodiment, the synthetic resin passage structural member 15 is welded to the engine side semi-arc shaped portion 18 of the U-shaped passage portion 14b of the intake passages 13A, 13B, 13C and 13D of the synthetic resin intake manifold body 16 along a joining line. This joining line has a loop shape (the joining line is the line that connects periphery walls of the intake passages 13A, 13B, 13C and 13D excluding the partition walls 17), as shown in FIG. 2.

Figure 3:
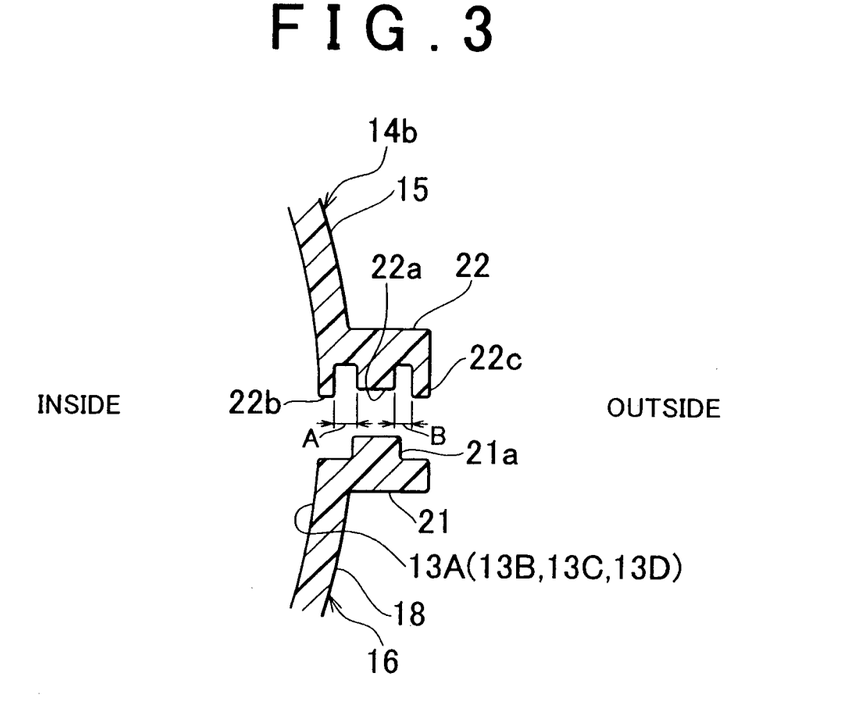
FIG. 3 is a cross section view of a body side joining flange and a structural member side joining flange prior to welding.
Figure 4:
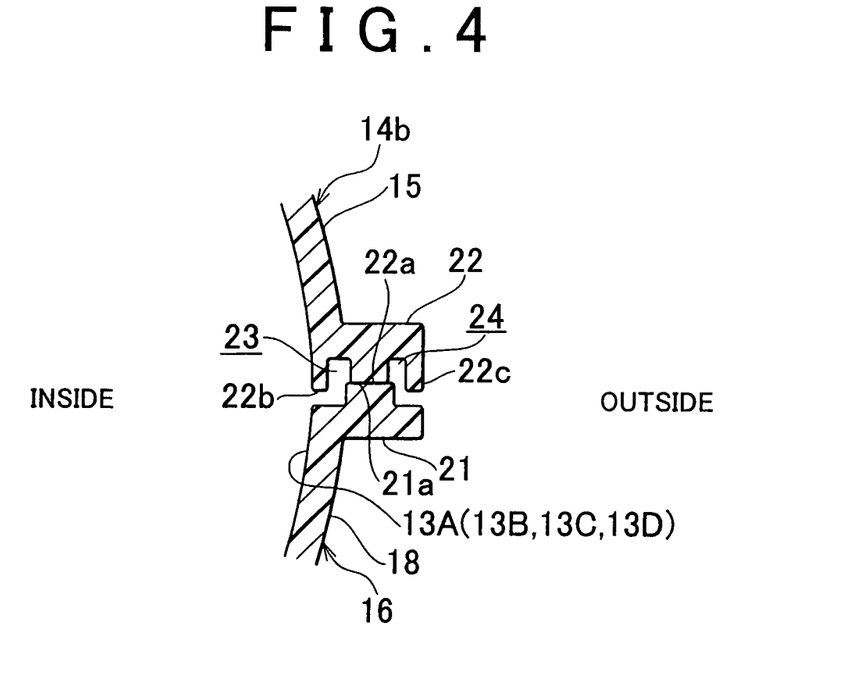
FIG. 4 is a cross section view showing positioning and alignment of the body side joining flange and the structural member side joining flange.
Figure 5:
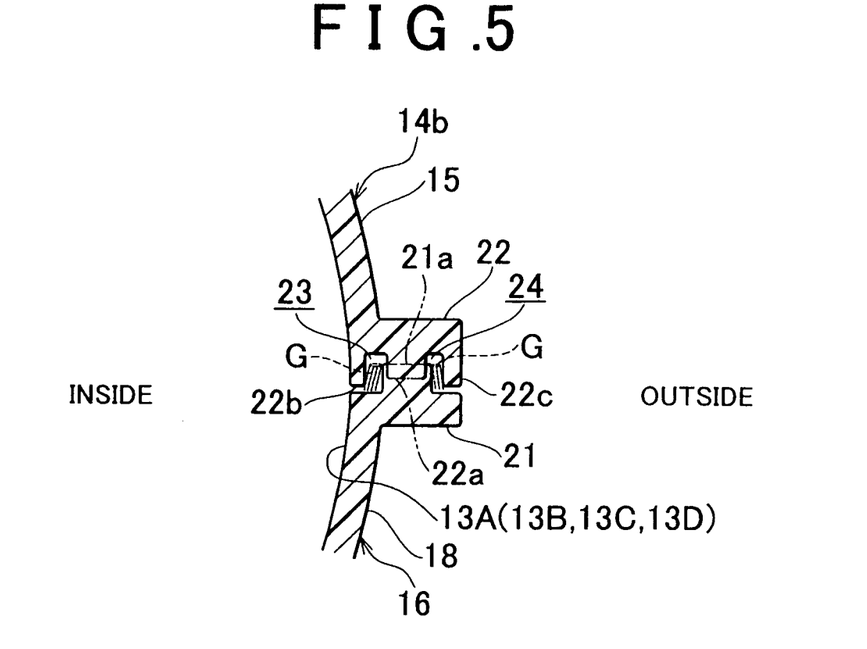
FIG. 5 is a cross section view showing a welded state of the body side joining flange and the structural member side joining flange.

In addition, as shown in FIG. 3, the synthetic resin intake manifold body 16 and the synthetic resin passage structural member 15 are respectively provided with a body side joining flange 21 and a structural member side joining flange 22 that extend continuously along the joining line at an outside thereof. The body side joining flange 21, which corresponds to a first joining flange among the two joining flanges 21 and 22, is provided with a protrusion 21a that protrudes towards the structural member side joining flange 22, which corresponds to a second joining flange. The protrusion 21a protrudes at a substantially central position in an inward-outward direction of the joining line, and is formed continuously along the joining line. On the other hand, a welding protrusion 22a is provided on the structural member side joining flange 22. This welding protrusion 22a is formed continuously along the joining line and protrudes at a substantially central position in an inwards-outwards direction of the joining line towards the body side joining flange 21. The welding protrusion 22a is welded to the protrusion 21a. Further, the structural member side joining flange 22 is also provided with inside and outside control walls 22b and 22c that respectively protrude toward the body side joining flange 21 at the inside and outside of the joining line with the welding protrusion 22a disposed therebetween. The inside and outside control walls 22b and 22c are provided continuously along the joining line. Prior to welding, the synthetic resin passage structural member 15 (the opposite-engine side substantially arc-shaped cross section portion) is positioned and aligned along the joining line with respect to the engine side semi-arc shaped portion 18 of the U-shaped passage portion 14b of the intake passages 13A, 13B, 13C and 13D of the synthetic resin intake manifold body 16, as shown in FIG. 4. At this time, an inside burr retaining groove 23 surrounded by the protrusion 21a of the body side joining flange 21 and the inside control wall 22b and the welding protrusion 22a of the structural member side joining flange 22 is formed at the inside of the joining line. This inside burr retaining groove 23 is formed continuously along the joining line. On the other hand, an outside burr retaining groove 24 surrounded by the protrusion 21a of the body side joining flange 21 and the outside control wall 22c and the welding protrusion 22a of the structural member side joining flange 22 is formed at the outside of the joining line. This outside burr retaining groove 24 is formed continuously along the joining line. Further, FIG. 5 shows a welded state of the body side joining flange 21 and the structural member side joining flange 22. When the welding protrusion 22a of the structural member side joining flange 22 that is welded to the protrusion 21a of the body side joining flange 21 is vibration welded, the welding protrusion 22a forms welding burr G, which flows to the inside and outside of the joining line, respectively. The inside burr retaining groove 23 and the outside burr retaining groove 24 are provided to trap and retain this welding burr G. In addition, when the synthetic resin passage structural member 15 is positioned and aligned along the joining line with respect to the engine side semi-arc shaped portion 18 of the U-shaped passage portion 14b of the intake passages 13A, 13B, 13C and 13D prior to welding as shown in FIG. 1, a dimension A of the inside burr retaining groove 23 is formed to be longer than a dimension B of the outside burr retaining groove 24. More specifically, the dimension A of the inside burr retaining groove 23 in the inward-outward direction between the inside control wall 22b and the welding protrusion 22a is formed to be longer by a predetermined ratio (for example, a ratio of around 1:1.1 to 1:1.2) than the dimension B of the outside burr retaining groove 24 in the inward-outward direction between the outside control wall 22c and the welding protrusion 22a. As a result, a volume of the inside burr retaining groove 23 is set to be larger than a volume of the outside burr retaining groove 24 by a predetermined ratio. With this configuration, when the synthetic resin passage structural member 15 is positioned and aligned along the joining line with respect to the engine side semi-arc shaped portion 18 of the U-shaped passage portion 14b of the intake passages 13A, 13B, 13C and 13D of the synthetic resin intake manifold body 16 prior to welding, an inside wall surface of the engine side semi-arc shaped portion 18 of the U-shaped passage portion 14b of the intake passages 13A, 13B, 13C and 13D is positioned to be flush with an inside wall surface of the opposite-engine side substantially arc-shaped cross section portion (the inside edge surface of the inside control wall 22b) of the synthetic resin passage structural member 15 at the inside of the joining line. In this flush state, respective inward-outward direction widths of the body side joining flange 21 and the structural member side joining flange 22 are the same. Further, the length of the body side joining flange 21 and the structural member side joining flange 22 in the outward direction of the joining line from the inside wall surfaces that are flush with each other is the same.

Figure 6:
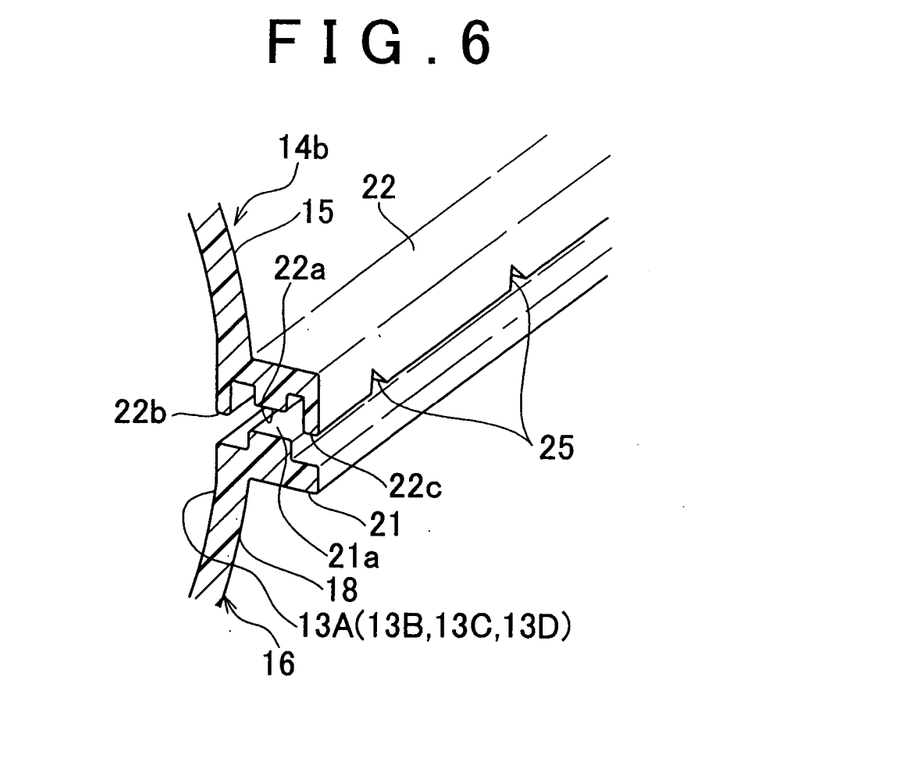
FIG. 6 is a perspective view showing the body side joining flange and the structural member side joining flange prior to welding as viewed from an outer side.

In addition, confirmation-use openings 25 are provided for confirming a state of progress of welding of the joining flanges 21 and 22 at the joining line as shown in FIG. 6 (only two are shown in the drawing). These confirmation-use openings 25 are provided in a tip end of the outside control wall 22c (at positions that are as far as possible from the welding portion of the protrusion 21a and the welding protrusion 22a). These confirmation-use openings 25 are formed as notches with a generally inverted V-shape, and are positioned at predetermined intervals along the joining line.

Accordingly, in the above described embodiment, when the synthetic resin passage structural member 15 (the opposite-engine side substantially arc-shaped cross section portion) is welded to the engine side semi-arc shaped portion 18 of the U-shaped passage portion 14b of the intake passages 13A, 13B, 13C and 13D of the synthetic resin intake manifold body 16, the welding protrusion 22a of the structural member side joining flange 22 is vibration welded to the protrusion 21a of the body side joining flange 21, whereby the welding burr G is formed. After the welding burr G has flowed to the inside and outside and has been retained in the inside and outside burr retaining grooves 23 and 24, a protrusion timing at which the welding burr G overflows and protrudes from the inside and outside burr retaining grooves 23 and 24 towards the inside and outside is different for each side due to the difference in the volumes of the inside and outside burr retaining grooves 23 and 24. More specifically, the welding burr G from the outside burr retaining groove 24 overflows and protrudes to the outside prior to when the welding burr G from the inside burr retaining groove 23 overflows and protrudes to the inside. As a result, if welding is stopped when the welding burr G protrudes to the outside, it is possible to reliably inhibit protrusion of the welding burr G to the inside. Thus, it is possible to inhibit formation of a protruding portion to the inside. Accordingly, no protruding portion exists that would act as an obstruction causing worsening of intake air flow resistance. As a result, protrusion of the welding burr G to the inside when the inside burr retaining groove 23 is full can be reliably inhibited in the same manner as if a protrusion were provided to block the overflow of the welding burr G from the inside burr retaining groove 23. Accordingly, bulging does not occur at an inside portion of the joining line where the joining flanges 21 and 22 are welded together due to the welding burr G having no place to escape to at the inside when the welding burr G fills the inside burr retaining groove 23. Thus, welding of the synthetic resin passage structural member 15 to the synthetic resin intake manifold body 16 can be performed smoothly. As a result, protrusion of the welding burr G to the inside when the synthetic resin passage structural member 15 is welded to the synthetic resin intake manifold body 16 can be reliably managed using a simple structure.

Moreover, the synthetic resin passage structural member 15 (the opposite-engine side substantially arc-shaped cross section portion) is positioned and aligned along the joining line with respect to the engine side semi-arc shaped portion 18 of the U-shaped passage portion 14b of the intake passages 13A, 13B, 13C and 13D of the synthetic resin intake manifold body 16 prior to welding. At this time, the dimension A in the inward-outward direction between the inside control wall 22b and the welding protrusion 22a of the inside burr retaining groove 23 is set to be longer than the dimension B in the inward-outward direction between the outside control wall 22c and the welding protrusion 22a of the outside burr retaining groove 24. Accordingly, the dimensional difference (A–B) in the inward-outward direction of the inside and outside burr retaining grooves 23 and 24 causes the respective welding burrs G that flow to the inside and outside of the joining line to flow such that: the welding burr G in the outside burr retaining groove 24 definitely overflows and protrudes to the outside prior to when the welding burr G in the inside burr retaining groove 23 overflows and protrudes to the inside. Accordingly, if welding is stopped when the welding burr G protrudes to the outside, it is possible to reliably inhibit protrusion of the welding burr G to the inside, which is extremely favorable from the point of view of reliably inhibiting worsening of intake air flow resistance.

In addition, the confirmation-use openings 25 for confirming the state of progress of welding of the joining flanges 21 and 22 at the joining line are formed as the notches with the generally inverted V-shape and are provided in the tip end of the outside control wall 22c at the predetermined intervals in the joining line direction. Accordingly, even if an outflow amount of the welding burr G to the outside is small, it is possible to use the confirmation-use openings 25 to directly view the welding portion of the protrusion 21a and the welding protrusion 22a. This enables welding quality to be controlled efficiency.

Further, when the synthetic resin passage structural member 15 is positioned and aligned along the joining line with respect to the engine side semi-arc shaped portion 18 of the U-shaped passage portion 14b of the intake passages 13A, 13B, 13C and 13D of the synthetic resin intake manifold body 16, the inside wall surface of the engine side semi-arc shaped portion 18 of the U-shaped passage portion 14b of the intake passages 13A, 13B, 13C and 13D is positioned to be flush with the inside wall surface of the opposite-engine side substantially arc-shaped cross section portion (the inside edge surface of the inside control wall 22b) of the synthetic resin passage structural member 15 at the inside of the joining line. As a result, no protrusion toward the inside of the intake passages 13A, 13B, 13C and 13D is formed that would restrict the design adopted for the intake passages 13A, 13B, 13C and 13D. Accordingly, the degree of design freedom is increased.

Figure 7:
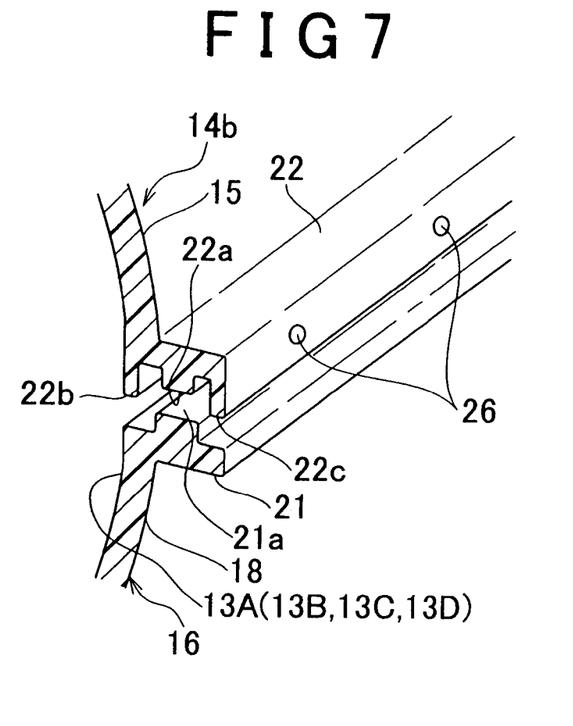
FIG. 7 is a perspective view showing the body side joining flange and the structural member side joining flange of a modified form of the embodiment prior to welding as viewed from an outer side.

Note that, the invention is not limited to the above described embodiment and includes a variety of other forms and modifications within its scope. For example, in the above described embodiment, the confirmation-use openings 25 are formed as substantially inverted V-shaped notches in the tip end of the outside control wall 22c. However, as shown in FIG. 7, confirmation-use openings 26 may be formed with a generally circular shape at predetermined intervals in the joining line direction in the vicinity of generally central points of the outside control wall 22c near to the welding portion of the protrusion 21a and the welding protrusion 22a. In this case, even if the outflow amount of the welding burr G to the outside is small, it is possible to use the confirmation-use openings 26 to directly view the welding portion of the protrusion 21a and the welding protrusion 22a. In addition, on the other hand, if the outflow amount of the welding burr G to the outside is large, it is possible to confirm the state of welding as quickly as possible before the outside burr retaining groove 24 becomes full since the welding burr G protrudes from the confirmation-use openings 26.

Figure 8:
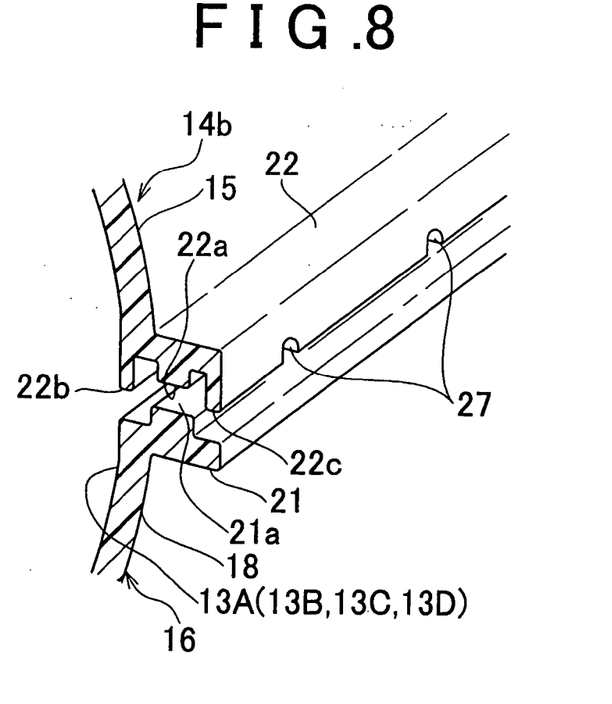
FIG. 8 is a perspective view showing the body side joining flange and the structural member side joining flange of another modified form of the embodiment prior to welding as viewed from an outer side.

Moreover, in the above described embodiment, the confirmation-use openings 25 are formed as the substantially inverted V-shaped notches in the tip end of the outside control wall 22c. However, as shown in FIG. 8, confirmation-use openings 27 may be formed as generally inverted U-shaped notches in the tip end of the outside control wall 22c. These confirmation-use openings 27 may be formed at predetermined intervals in the joining line direction. In this case, even if the outflow amount of the welding burr G to the outside is small, the confirmation-use openings 27 can be used to view even deeper toward the welding portion of the protrusion 21a and the welding protrusion 22a. Accordingly, welding quality can be controlled even more efficiently. In addition, as compared to the confirmation-use openings 25 that are cut as the generally inverted V-shaped notches, the cutting operation for the generally U-shaped notches is easier to perform. Thus, this configuration is extremely favorable from the point of view of mass production.

Further, in the above described embodiment, as the synthetic resin passage structural member 15, just the opposite-engine side substantially arc-shaped cross section portion of the U-shaped passage portion 14b of the intake passages 13A, 13B, 13C and 13D is separate from the synthetic resin intake manifold body 1. This opposite-engine side substantially arc-shaped cross section portion is welded along the joining line to the engine side semi-arc shaped portion 18 of the U-shaped passage portion 14b of the intake passages 13A, 13B, 13C and 13D of the synthetic resin intake manifold body 16. However, the synthetic resin passage structural member that is separate from the synthetic resin intake manifold is not limited to that described above. For example, the configuration may be such that the surge tank or the like is similarly divided with a substantially semi-arc shaped cross section, and vibration welded to the synthetic resin passage structural member body.

Further, the above embodiment describes an example in which the synthetic resin passage structural member 15 is vibration welded to the engine side semi-arc shaped portion 18 of the U-shaped passage portion 14b of the intake passages 13A, 13B, 13C and 13D of the synthetic resin intake manifold body 16. However, dielectric welding, hot plate welding, electromagnetic induction welding or hot wire welding may be used.

What is claimed is:

1. A welding structure for a synthetic resin intake manifold, comprising:
    a synthetic resin passage structural member that forms at least one portion of the synthetic resin intake manifold;
    a synthetic resin intake manifold body to which the synthetic resin passage structural member is welded along a joining line that has a loop shape;
    a first joining flange provided on the synthetic resin intake manifold body along the joining line;
    a second joining flange provided on the synthetic resin passage structural member along the joining line;
    a protrusion provided on the first joining flange and protruding toward the second joining flange;
    a welding protrusion provided on the second joining flange, the welding protrusion protruding toward the first joining flange and being welded to the protrusion; and
    an inside control wall and an outside control wall which respectively protrude toward the first joining flange at an inside and an outside of the joining line, and which are respectively provided to either side of the welding protrusion, wherein
    the synthetic resin passage structural member is positioned and aligned with respect to the synthetic resin intake manifold body along the joining line prior to welding such that a volume of an inside burr retaining groove formed by the protrusion of the first joining flange and the inside control wall of the second joining flange and the welding protrusion of the second joining flange is set to be larger than a volume of an outside burr retaining groove formed by the protrusion of the first joining flange and the outside control wall of the second joining flange and the welding protrusion of the second joining flange, and wherein
    an entire surface of the protrusion facing the welding protrusion and an entire surface of the welding protrusion facing the protrusion are substantially perpendicular to a pressing direction.

2. The welding structure for the synthetic resin intake manifold according to claim 1, wherein the synthetic resin passage structural member is positioned and aligned with respect to the synthetic resin intake manifold body along the joining line prior to welding such that a dimension of the inside burr retaining groove in an inward-outward direction between the inside control wall and the welding protrusion is set to be longer than a dimension of the outside burr retaining groove in the inward-outward direction between the outside control wall and the welding protrusion.

3. The welding structure for the synthetic resin intake manifold according to claim 1, wherein the outside control wall is provided with a confirmation-use opening for confirming a state of progress of welding of the first and the second joining flanges at the joining line.

4. The welding structure for the synthetic resin intake manifold according to claim 3, wherein the confirmation-use opening is formed as a v-shaped notch in an end tip of the outside control wall.

5. The welding structure for the synthetic resin intake manifold according to claim 3, wherein the confirmation-use opening is provided in the outside control wall, the confirmation-use openings being cut in a circular shape and being disposed at predetermined intervals in a joining line direction in a vicinity of a central point of the outside control wall.

6. The welding structure for the synthetic resin intake manifold according to claim 3, wherein the confirmation-use opening is formed as a u-shaped notch in an end tip of the outside control wall.

* * * * *